(12) United States Patent
Green

(10) Patent No.: US 6,519,385 B1
(45) Date of Patent: Feb. 11, 2003

(54) METHOD AND APPARATUS FOR CONTROLLABLY POSITIONING AN OPTICAL FIBER TO INTRODUCE A PHASE SHIFT

(75) Inventor: Samuel I. Green, St. Louis, MO (US)

(73) Assignee: The Boeing Company, Seattle, WA (US)

( * ) Notice: Subject to any disclaimer, the term of this patent is extended or adjusted under 35 U.S.C. 154(b) by 129 days.

(21) Appl. No.: 09/672,797

(22) Filed: Sep. 27, 2000

(51) Int. Cl.[7] .................................................. G02B 6/26
(52) U.S. Cl. ............................. 385/27; 385/3; 385/31; 385/18; 385/25
(58) Field of Search ............................. 385/3, 15, 16, 385/17, 18, 25, 26, 27, 31, 39, 42, 1, 2

(56) References Cited

U.S. PATENT DOCUMENTS

| | | | |
|---|---|---|---|
| 4,671,113 A | 6/1987 | Carome | 73/516 |
| 4,703,287 A | 10/1987 | Fournier, Jr. et al. | 332/7.52 |
| 4,814,774 A | 3/1989 | Herczfeld | 342/372 |
| 5,066,088 A | * 11/1991 | Davies et al. | 385/25 |
| 5,233,673 A | * 8/1993 | Vali et al. | 385/3 |
| 5,386,485 A | * 1/1995 | Saito et al. | 385/17 |
| 5,602,955 A | 2/1997 | Haake | 385/136 |
| 5,606,635 A | 2/1997 | Haake | 385/53 |
| 5,694,408 A | 12/1997 | Bott et al. | 372/6 |
| 5,699,463 A | * 12/1997 | Yang et al. | 385/22 |
| 5,881,198 A | 3/1999 | Haake | 385/136 |
| 6,256,429 B1 | * 7/2001 | Ehrfeld et al. | 385/17 |

* cited by examiner

*Primary Examiner*—Brian Healy
(74) *Attorney, Agent, or Firm*—Alston & Bird LLP

(57) ABSTRACT

An apparatus and method are provided for controllably phase shifting the optical signals emitted by at least one of a plurality of optical fibers by positioning the end portion of the optical fiber that emits the optical signals to be phase shifted relative to the optical signals emitted by the other optical fibers. The apparatus includes a plurality of optical fibers for supporting the propagation of optical signals from a first end to an opposed second end from which the optical signals are emitted. The apparatus also includes at least one micromanipulator, typically operating under the direction of a controller, for controllably positioning the second end of a respective optical fiber relative to the second ends of the other optical fibers, thereby shifting the phase of the optical signals emitted by the respective optical fibers. Typically, the optical signals have a predetermined direction of propagation following emission by an optical fiber. As such, each micromanipulator preferably moves the second end of the respective optical fiber along the predetermined direction of propagation in order to shift the phase of the optical signals. By controllably imparting a phase shift to one or more of the optical signals, the method and apparatus can establish a predetermined phase relationship, such as a phase matching relationship, between the optical signals emitted by each of the optical fibers.

18 Claims, 5 Drawing Sheets

METHOD AND APPARATUS FOR CONTROLLABLY POSITIONING AN OPTICAL FIBER TO INTRODUCE A PHASE SHIFT

FIELD OF THE INVENTION

The present invention relates generally to methods and apparatus for phase shifting at least one of a plurality of optical signals to obtain a predetermined phase relationship between the optical signals and, more particularly, to a method and apparatus for controllably positioning an optical fiber in order to adjust the phase of the optical signals emitted by the respective optical fiber relative to the optical signals emitted by other optical fibers such that the predetermined phase relationship is obtained.

BACKGROUND OF THE INVENTION

It is desirable in many applications to generate laser radiation having relatively high power levels. For example, a variety of military, material processing, medical, and communications applications demand laser radiation having relatively high power levels. One technique for generating these relatively high power levels is to combine or sum the optical signals emitted by a plurality of laser sources, all of which typically derive their origin from a common source. As described in U.S. Pat. No. 5,694,408 to Eric H. Bott, et al., the contents of which are incorporated herein by reference, the laser signals emitted by a laser signal source can be split into a plurality of secondary laser signals, each of which can be amplified, such as by means of a fiber amplifier or other laser amplifier. The amplified secondary laser signals can then be recombined in order to generate an output beam capable of having relatively high power levels. In order to properly combine a plurality of optical signals to form a single diffraction limited spot in the far field, however, the optical signals should be coherent.

Optical signals combine by vector summation of their electromagnetic fields. Combined coherent optical signals may sum or cancel depending on the relative optical phase of the combined electromagnetic fields. Relative phases of the combined signals vary with motion or displacement of the optical fibers that constitute the paths of the different signals. Even an acoustic wave passing through the fiber environment can noticeably affect the differential optical phase between the plurality of paths.

In order to ensure that the coherent optical signals are in the proper phase for optimal combination, the phase of the optical signals must be adjusted such that each of the optical signals is matched in phase (phase matched) with the other optical signals. A variety of techniques have been developed for phase shifting the optical signals emitted by an optical fiber. For example, U.S. Pat. Nos. 4,703,287 and 4,814,774 describe piezoelectric elements that stretch the medial portion of an optical fiber in order to alter the phase of the signals emitted by the optical fiber. In this regard, stretching of an optical fiber introduces a time delay to a path length change which is equivalent to a change in phase of the signals emitted by the optical fiber. Alternatively, current control or reverse bias semiconductor junction voltage controlled phase shifters have been developed for introducing phase shifts. Moreover, electro-optic modulators, such as those described by U.S. Pat. No. 5,694,408, have been developed in order to controllably adjust the phase of the optical signals emitted by each of a plurality of optical fibers.

While these prior techniques for adjusting the phase of the optical signals emitted by each of a plurality of optical fibers can be effective for phase matching which, in turn, is necessary to permit the coherent combination of the plurality of optical signals, these prior techniques are oftentimes quite expensive and trouble prone. As such, it would be desirable to provide an improved technique for adjusting the phase of the optical signals emitted by each of a plurality of optical fibers in order to facilitate the coherent combination of the plurality of optical signals in a less expensive and more reliable fashion.

SUMMARY OF THE INVENTION

An apparatus and method are therefore provided for controllably phase shifting at least one of a plurality of optical signals by controllably positioning the end portion of the optical fiber that emits the optical signals to be phase shifted relative to the end portions of a number of other optical fibers that emit the remainder of the optical signals. The optical path length change introduces a change in propagation time delay which is equivalent to a change in phase of the signals emitted by the optical fiber. By utilizing a micromanipulator to controllably position the end portion of the respective optical fiber, the method and apparatus of the present invention can reliably and relatively inexpensively control the phases of a plurality of optical signals in order to maintain a predetermined phase relationship, such as by phase matching each of the plurality of optical signals.

The phase shifting apparatus includes a plurality of optical fibers for supporting the propagation of optical signals from a first end to an opposed second end from which the optical signals are emitted. In order for the optical signals transmitted via each of the optical fibers to have the same frequency, the apparatus typically includes a common optical source for providing optical signals to each of the optical fibers. The phase shifting apparatus also includes at least one micromanipulator for controllably positioning the second end of a respective optical fiber relative to the second ends of the other optical fibers, thereby shifting the phase of the optical signals emitted by the respective optical fiber. In this regard, the phase shifting apparatus can include a controller for directing the micromanipulator in order to controllably position the second end of the respective optical fiber. By controllably positioning the second end(s) of one or more of the optical fibers, the phase shifting apparatus can establish a predetermined phase relationship between the optical signals emitted by each of the optical fibers.

In one advantageous embodiment, the phase shifting apparatus includes a plurality of micromanipulators, one of which is associated with each optical fiber. As such, the micromanipulators can controllably position the second ends of the respective optical fibers such that the optical signals emitted by the plurality of optical fibers are phase matched. Typically, the optical signals have a predetermined direction of propagation following emission by an optical fiber. As such, each micromanipulator preferably moves the second end of the respective optical fiber along, or parallel to, the predetermined direction of propagation in order to shift the phase of the optical signals. Although the phase shifting apparatus can include a variety of micromanipulators, the phase shifting apparatus of one advantageous embodiment includes a micromanipulator having a carrier upon which the second end of the respective optical fiber is mounted and at least one actuator element for moving both the carrier and the second end of the respective optical fiber relative to the other optical fibers.

In operation, optical signals having a predetermined wavelength are provided to a plurality of optical fibers.

Following transmission of the optical signals along the plurality of optical fibers from a first end to an opposed second end, the optical signals are emitted. In order to establish a predetermined phase relationship between the optical signals emitted by the optical fibers, the second end of at least one optical fiber is controllably positioned relative to the second ends of the other optical fibers in order to shift the phase of the optical signals emitted by the respective optical fiber. For example, the second end of a respective optical fiber can be controllably positioned by moving the second end of the respective optical fiber in the predetermined direction in which the optical signals propagate following emission by the optical fibers. Typically, the second end of each optical fiber is controllably positioned such that the optical signals emitted by each of the optical fibers are phase matched.

By phase shifting the optical signals emitted by one or more of the optical fibers, the method and apparatus of the present invention can match the phase of the optical signals. As such, the optical signals can then be coherently combined in order to generate an output beam having much higher power than any of the individual optical signals. Moreover, by phase shifting the optical signals emitted by one or more of the optical fibers by controllably positioning the end portions of the optical fibers with a micromanipulator or the like, the method and apparatus of the present invention can establish the predetermined phase relationship between the optical signals in a reliable and relatively inexpensive manner.

BRIEF DESCRIPTION OF THE DRAWINGS

Figure 1:
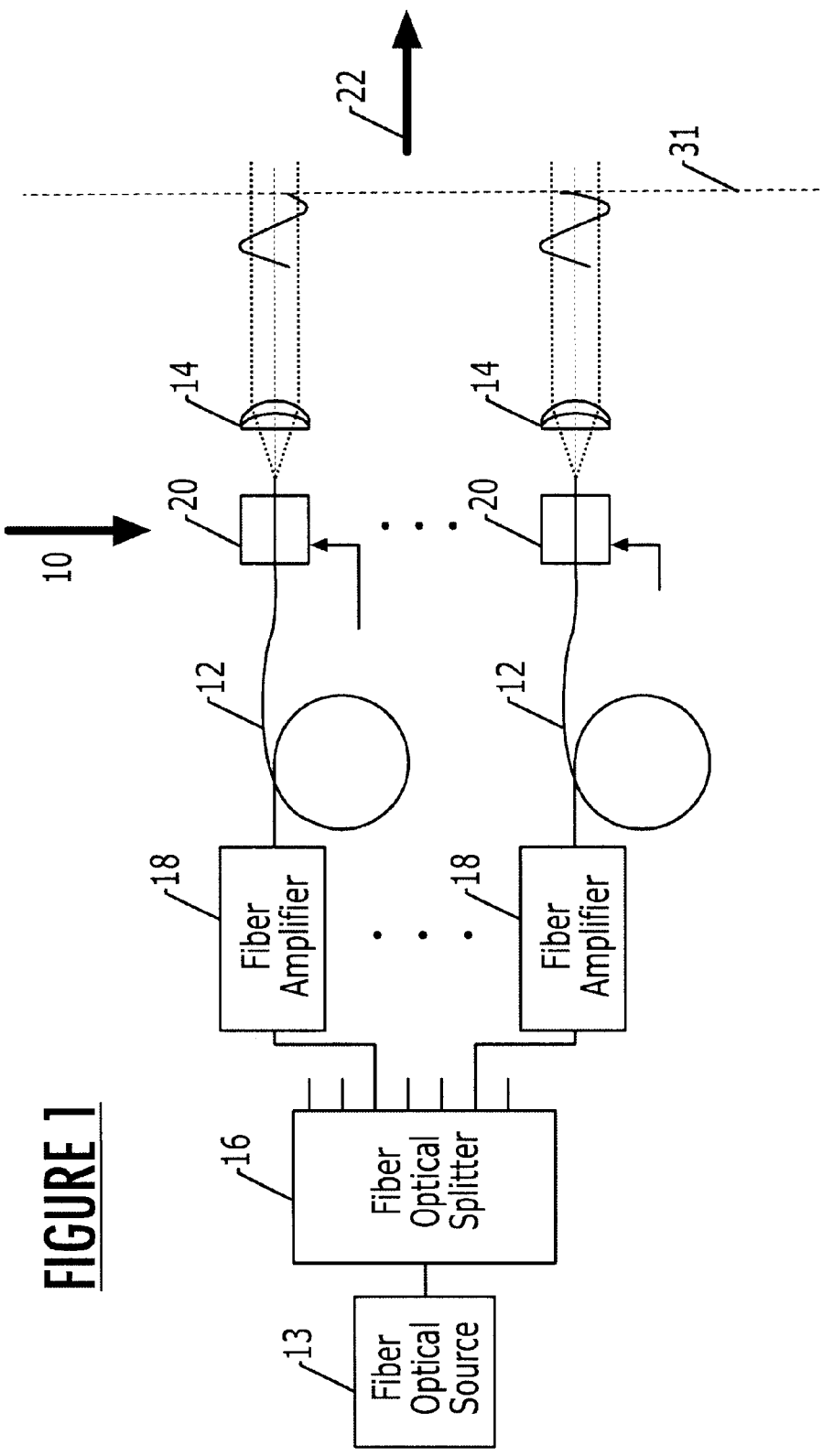
Figure 2:
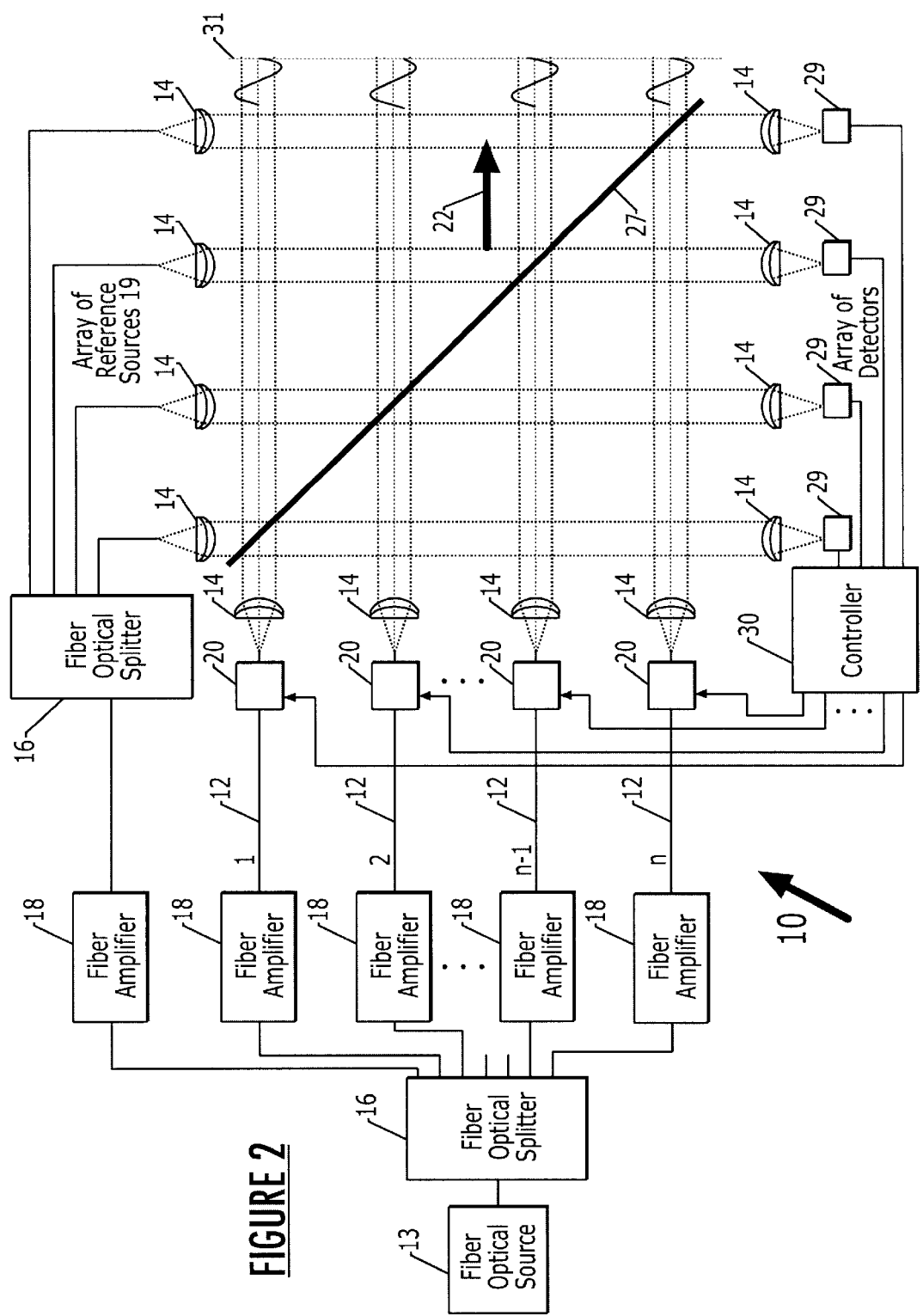
Figure 3:
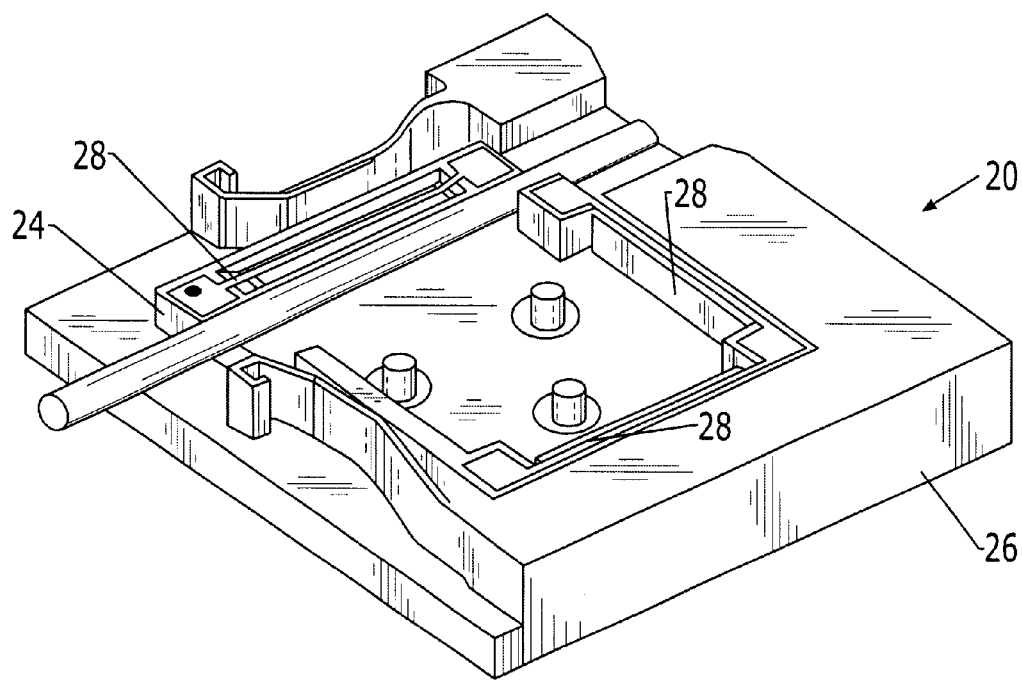
Figure 4:
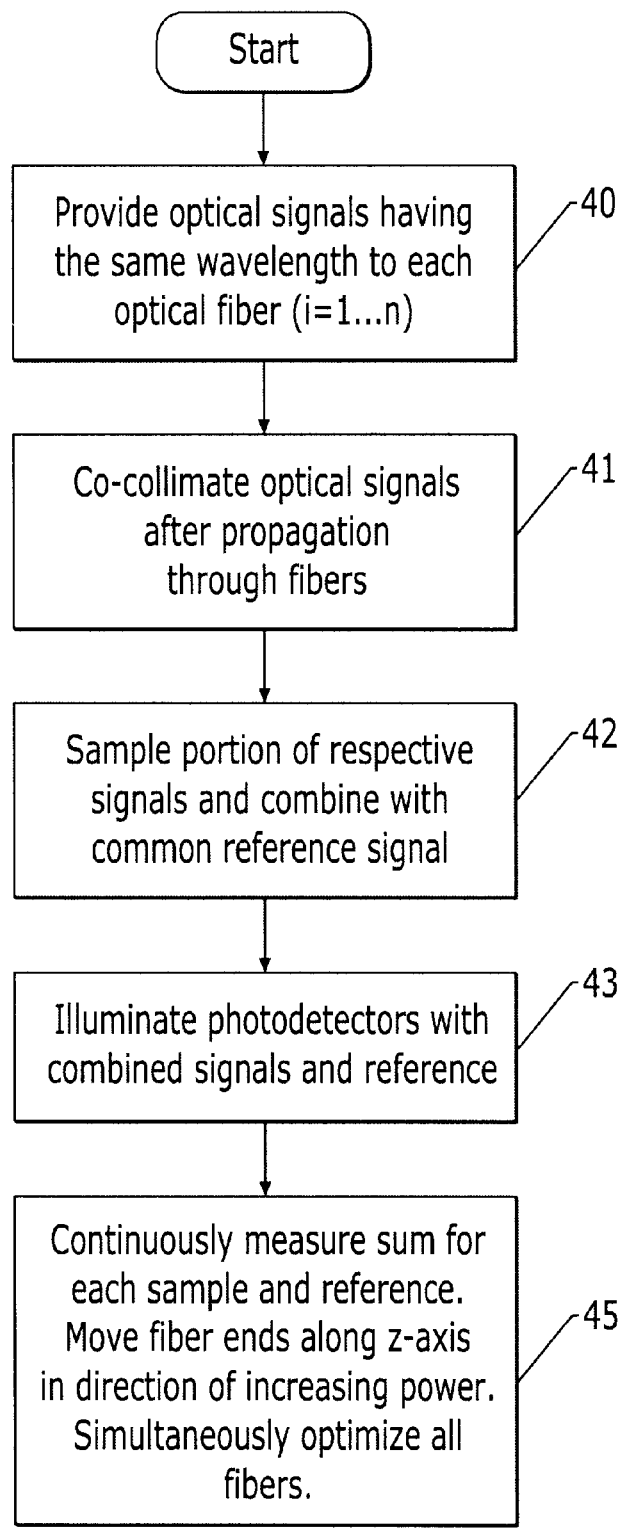
Figure 5:
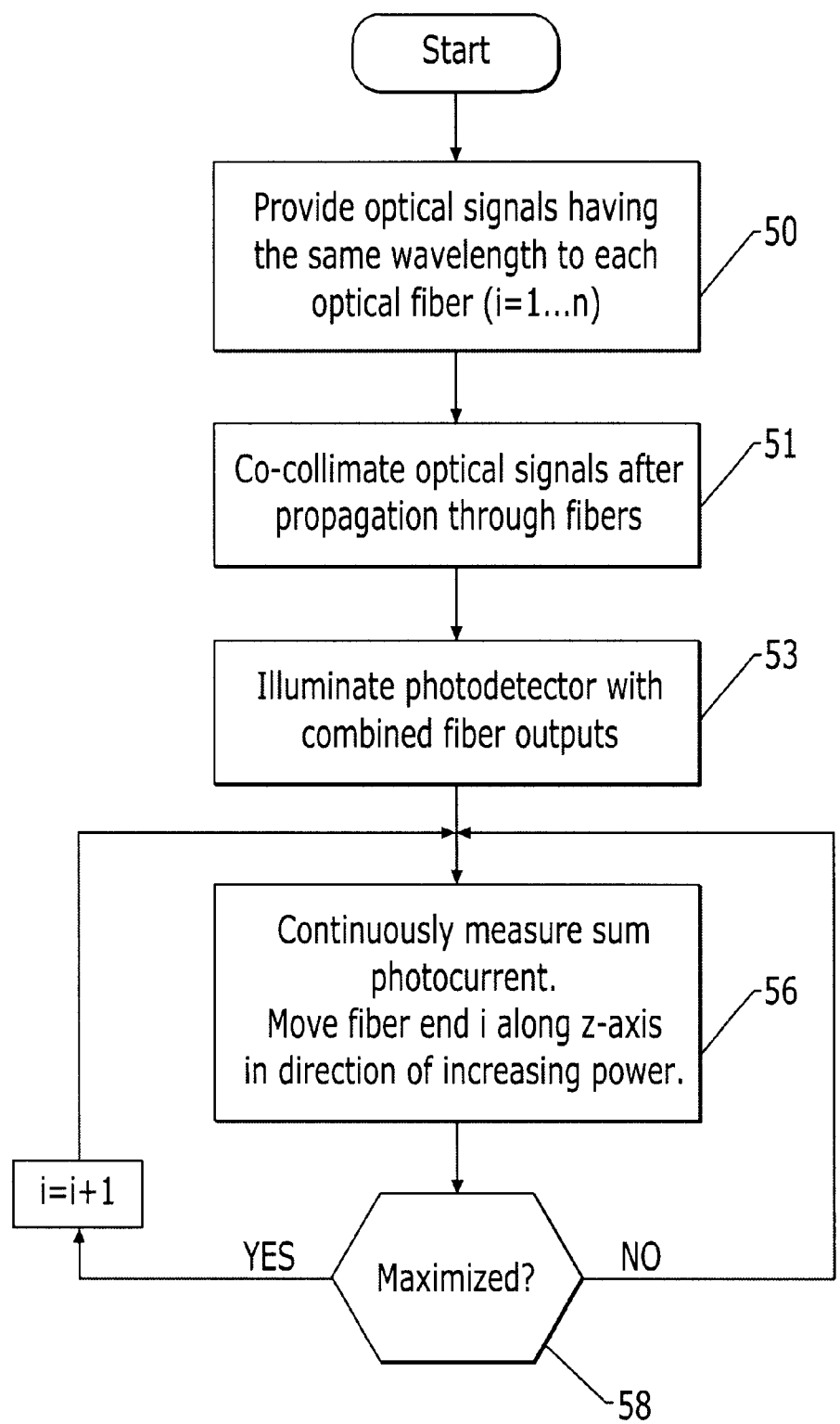

Having thus described the invention in general terms, reference will now be made to the accompanying drawings, which are not necessarily drawn to scale, and wherein:

FIG. 1 is a schematic representation of a phase shifting apparatus according to one embodiment to the present invention;

FIG. 2 is a schematic representation of a phase shifting apparatus according to one embodiment of the present invention that illustrates arrays of reference sources and detectors for establishing a predetermined phase relationship between the optical signals emitted by each of the optical fibers;

FIG. 3 is a perspective view of a micromanipulator according to one embodiment to the present invention for controllably positioning the second end of a respective optical fiber;

FIG. 4 is a flow chart illustrating the operations performed to simultaneously position the ends of each of the optical fibers according to the method and apparatus of one embodiment of the present invention; and FIG. 5 is a flow chart illustrating the operations performed to sequentially position the ends of each of the optical fibers according to the method and apparatus of another embodiment to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, an apparatus 10 for establishing a predetermined phase relationship between the optical signals emitted by each of a plurality of optical fibers 12 is depicted. Typically, the apparatus and method of the present invention are designed to adjust the respective phases of the optical signals such that the optical signals are phase matched. As such, the plurality of optical signals can be coherently combined in order, for example, to generate an output beam having a relatively high power level. However, the apparatus and method of the present invention can shift the respective phases of the optical signals in order to establish other predetermined phase relationships, for example, to steer a resultant optical beam.

As shown in FIG. 1, the apparatus 10 of the present invention includes a plurality of optical fibers 12 extending between opposed first and second ends for supporting the propagation of optical signals. The apparatus also generally includes an optical source 13, such as a laser, for providing the optical signals to the optical fibers. As depicted, a common optical source, such as a single optical source or two or more phase locked sources, preferably provides the optical signals to each of the optical fibers such that the optical signals propagating through each of the optical fibers have the same frequency and wavelength so that the optical signals can subsequently be coherently combined.

The apparatus 10 also generally includes a splitter 16, such as a waveguide signal splitter, a fused biconic fiber signal splitter or the like, for dividing the primary signals emitted by the optical source 13 into a plurality of secondary signals. In instances in which the apparatus is designed to generate an output beam having a relatively high power level, the apparatus can further include a plurality of optical amplifiers 18, such as erbium doped fiber amplifiers or semiconductor optical amplifiers, for amplifying respective secondary signals. In this embodiment, each of the amplified secondary signals is then provided to the first end of a respective optical fiber 12. In order to reduce the number of components, the plurality of optical fibers can be comprised of a plurality of fiber amplifiers to amplify the optical signals propagating therealong such that the separate amplifiers can be eliminated.

Following propagation along the optical fibers 12, the optical signals are emitted from the second end thereof. Even though the optical signals propagating along each of the optical fibers originate from a common optical source 13 and travel along optical paths that are generally designed to have the same length, the phase of the optical signals emitted by each of the optical fibers will inevitably be somewhat different. These phase differences can be attributed to a number of different factors, including slight differences in the optical path lengths due to fiber movement, vibration, or the like that slightly alter the propagation of the optical signals in some manner. According to the present invention, the method and apparatus controllably shift the phase of the optical signals emitted by at least one and, preferably, each of the optical fibers such that a predetermined phase relationship is established for the optical signals. Moreover, in order to coherently combine the optical signals emitted by each of the optical fibers, the method and apparatus preferably adjust the phase of the optical signals emitted by each optical fiber so that the phases of the optical signals match, i.e., are close to equal.

According to the present invention, the apparatus 10 therefore includes at least one micromanipulator 20 for controllably positioning the second end of a respective optical fiber 12 relative to the second ends of the other optical fibers. In this regard, the optical signals typically have a predetermined direction of propagation following emission by the optical fibers as shown by the arrow designated 22 in FIG. 1. As such, the micromanipulator preferably moves the second end of the respective optical fiber in the predetermined direction of propagation in order to shift the phase of the optical signals. In this regard, the micromanipulator can move the second end of the optical fiber either in the same direction as the direction of propagation or in the exact opposite direction from the direction of propagation. For example, the micromanipulator can induce a phase change of 360° by moving the second end of the respective optical fiber by a distance equal to one wavelength of the optical signals in the predetermined direction of propagation. Similarly, the micromanipulator can advance or retard the optical phase by 180° by moving the second end of the respective optical fiber along the direction of propagation by a distance of half of a wavelength in either the direction of propagation or in exactly the opposite direction. As will be apparent, the micromanipulator can introduce other phase shifts by merely moving the second end of the respective optical fiber by a corresponding fraction of the wavelength of the optical signals.

From one fiber end to the opposed end, the path length and phase shift are nominally fixed except as affected by internal path length changes due to thermal expansion, propagation of sound, and slight stretching or compression due to movement of a portion of the fiber from one placement to another. Given the nominal fixed delay or phase shift from one fiber end to an opposed end, the incremental phase shift described above is achieved by positioning a fiber end so that the delay or phase from the fiber end to a fixed external reference, such as the rightmost vertical line in FIGS. 1 and 2, is adjustable. Accordingly, the phases of the optical signals at the fixed external reference can be adjusted to match in order to permit the optical signals to be optimally combined. Alternatively, the phases of the optical signals at the fixed external reference can be adjusted to establish some other phase relationship in order to controllably steer the resulting beam.

As depicted in FIG. 1, the apparatus 10 of the present invention preferably includes a plurality of micromanipulators 20, one of which is associated with each optical fiber 12. As such, the plurality of micromanipulators can controllably position the second end of each optical fiber. Thus, the optical signals emitted by the plurality of optical fibers can be phase matched.

Although the apparatus can include a variety of different types of micromanipulators 20, the micromanipulator is preferably embodied by the optical fiber alignment device described by U.S. Pat. Nos. 5,602,955; 5,606,635; and 5,881,198 to John M. Haake, the contents of each of which are incorporated herein by reference. As shown in FIG. 3, for example, each micromanipulator can include a carrier 24 that is movably supported relative to an underlying substrate 26. Each micromanipulator can also include at least one actuator element 28 for controllably moving the carrier relative to the underlying substrate. By mounting the second end of the optical fiber 12 upon the carrier of the respective micromanipulator, actuation of the actuator element can controllably move not only the carrier, but also the second end of the respective optical fiber in the predetermined direction of propagation of the optical signals emitted by the respective optical fiber.

As described above, the apparatus 10 preferably includes a plurality of micromanipulators 20, one of which is associated with each optical fiber 12. These micromanipulators are preferably mounted upon a common substrate 26 such that each micromanipulator can move the second end of the respective optical fiber relative not only to the underlying substrate, but also to the second ends of the other optical fibers. In this regard, the optical fiber alignment device of the aforementioned patents to John M. Haake is particularly advantageous, since a plurality of micromanipulators can be concurrently fabricated upon a common substrate and can be disposed in a linear or other type of array in order to controllably position the second ends of a corresponding array of optical fibers.

As depicted in FIG. 2 which depicts a more detailed view of the apparatus 10, the apparatus can further include a controller 30 for directing each micromanipulator 20 to move the second end of the respective optical fiber 12 by a predetermined amount in order to introduce a corresponding phase shift. For example, in instances in which the micromanipulator is an optical fiber alignment device, the controller can control the heater current that is passed through the actuator elements 28 which, in turn, controls the displacement of the actuator elements.

In operation, optical signals having a predetermined wavelength are provided to each of a plurality of optical fibers 12 designated 1, 2, . . . n−1, n. See block 40 of FIG. 4. As described above, the optical signals are preferably amplified either prior to their introduction into the optical fibers or during their propagation through the optical fibers such that the resulting output beam will have a relatively high power level. The second end of each optical fiber is then controllably positioned relative to the second ends of the other optical fibers in order to shift the phase of the optical signals emitted by the respective optical fiber such that the optical signals emitted by each of the optical fibers have a predetermined phase relationship. In this regard, the optical fibers can be positioned either sequentially or simultaneously with both techniques being described below.

In the embodiment depicted in FIG. 2 in which the optical fibers 12 are positioned simultaneously, optical signals having the predetermined wavelength are also utilized as a reference source. In order to have a separate reference source for each optical fiber, the optical signals that will form the reference sources are split into n signals and collimated to form an array 19 of n reference sources. See block 41 of FIG. 4. A portion of the optical signals emitted by each optical fiber are then sampled by means of an optical splitter 27 and combined with a respective reference signal. See block 42 of FIG. 4. The combined signals illuminate a respective photodetector 29 which provides a signal to the controller 30 indicative of the power level of the combined signals. See block 43. While the power of the combined signals is being continuously measured, the controller directs the micromanipulator 20 associated with each optical fiber to move the second end of the respective fiber along the optic axis (also designated the z-axis) of the collimating lens 14. See block 45. Typically, the controller directs each micromanipulator to move the second end of the respective fiber in the direction in which the detected power of the combined signals increases until the detected power is maximized. See block 45. At this point, the phase of the optical signals emitted by each optical fiber and the phase of the respective reference signal are matched.

In embodiments such as described above in which the each of the reference sources 19 are split from a common source and are therefore identical, the phase of optical signals emitted by each of the optical fibers 12 will therefore be matched at the reference plane 31. By phase matching the optical signals emitted by the plurality of optical fibers in this manner, the optical signals can be coherently combined in order to produce an output beam having the greatest power level. Alternatively, one or more of the reference signals can be phase shifted prior to being combined with the optical signals emitted by the optical fibers such that the alignment process described above will establish some other predetermined type of phase relationship so as to permit the optical signals to be steered. In either instance, this process of individually positioning the second end of each optical fiber can be repeated either continuously or on a periodic basis in order to accommodate any variations in the phase of the optical signals introduced by external forces or the like.

In the alternative embodiment in which the optical fibers 12 are positioned in a sequential manner, the optical signals emitted by each of the optical fibers are combined and directed so as to illuminate a single monitor photodetector. See blocks 50, 51 and 53 of FIG. 5. Thereafter, the second end of a first optical fiber is moved in the direction in which the detected power of the combined signals increases until the detected power is maximized. See blocks 56 and 58. In turn, the second ends of each of the other optical fibers, i.e., the optical fibers designated 2, . . . n, are then likewise positioned at the respective location at which the output beam has the greatest power level. As such, the phase of optical signals emitted by each of the optical fibers will therefore be matched. As described above, this process of sequentially positioning the second end of each optical fiber in order to maximize the power level of the resulting output beam can also be repeated either continuously or on a periodic basis as desired.

Although not necessary for the practice of the present invention, the phase shifting provided by the method and apparatus of the present invention can be combined with the collimation techniques described by U.S. patent application No. 09/672,522 entitled Fiber Optic Collimation Apparatus and Associated Method to Samuel I. Green, et al., filed concurrently herewith, the contents of which are also incorporated by reference herein. In this instance, the same micromanipulators 20 that controllably move the second end of each optical fiber 12 in order to introduce a desired phase shift can also position the second end of each optical fiber to be located coincident with the focal point of a respective collimating lens such that the optical signals emitted thereby can be appropriately collimated. In this regard, the second end of each optical fiber is preferably initially positioned at the focal point of the respective collimating lens. Thereafter, the second end of each optical fiber can be moved slightly in order to adjust the phase of the optical signals emitted thereby in order to match the phase of the optical signals emitted by the other optical fibers. It is noted, however, that the amount by which the second end of the optical fibers must be moved in order to appropriately adjust the phase of the optical signals is generally relatively small, i.e., on the order of a fraction of a wavelength of the optical signals, and does not substantially impair the collimation of the optical signals since the second end of the optical fiber is not moved far from the focal point.

While the same type of micromanipulators 20 can be utilized in this embodiment to position the second ends of the optical fibers 12 such that the optical signals are both phase matched and collimated, the micromanipulators typically include additional actuator elements 28 in order to position the second end of the optical fiber not only in the predetermined direction of propagation of the optical signals, but in each of the x, y and z planes relative to the respective collimating lens. In this regard, the microman-ipulator depicted in FIG. 3 includes three actuator elements, one of which moves the carrier 24 along the direction of the fiber axis and, in turn, the second end of the optical fiber mounted upon the carrier relative to the substrate 26 and relative to the second ends of the other optical fibers. In contrast, an apparatus 10 designed merely to adjust the phase of the optical signals emitted by a plurality of optical fibers need only have micromanipulators that include a single actuator element 28 for moving the second end of the optical fiber in the predetermined direction of propagation of the optical signals.

By phase shifting the optical signals emitted by one or more of the optical fibers 12, the method and apparatus 10 of the present invention can phase match the optical signals at an external reference plane. As such, the optical signals have then been coherently combined to generate an output beam having much higher brightness than any other possible combination of the individual optical signals and are able to be collimated and directed as if they were a single high quality coherent source. Moreover, by phase shifting the optical signals emitted by one or more of the optical fibers by controllably positioning the end portions of the optical fibers with a micromanipulator 20 or the like, the method and apparatus of the present invention can establish the predetermined phase relationship between the optical signals in a reliable and relatively inexpensive manner.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for phase shifting at least one of a plurality of optical signals, the apparatus comprising:

an optical source for providing optical signals;

a plurality of optical fibers for conveying the optical signals from said optical source, each optical fiber having a first end for receiving the optical signals and an opposed second end;

an optical splitter for separately sampling the optical signals emitted by each optical fiber and for directing the sampled optical signals into combination with respective reference signals; and at least one micromanipulator for controllably positioning the second end of a respective optical fiber relative to the second ends of the other optical fibers based upon the power of the combined signals, thereby shifting the phase of the optical signals emitted by the respective optical fiber such that the optical signals emitted by each of said optical fibers have a predetermined phase relationship.

2. An apparatus according to claim 1 further comprising a plurality of micromanipulators, one of which is associated with each optical fiber.

3. An apparatus according to claim 2 wherein said plurality of micromanipulators controllably position the second ends of respective optical fibers such that the optical signals emitted by said plurality of optical fibers are phase matched.

4. An apparatus according to claim 1 wherein the optical signals have a predetermined direction of propagation following emission by said optical fibers, and wherein each said micromanipulator moves the second end of the respective optical fiber nominally along the predetermined direction of propagation in order to shift the phase of the optical signals.

5. An apparatus according to claim 1 further comprising a controller for directing each said micromanipulator to controllably position the second end of the respective optical fiber.

6. An apparatus for phase shifting at least one of a plurality of optical signals, the apparatus comprising:
   an optical source for providing optical signals;
   a plurality of optical fibers for conveying the optical signals from said optical source, each optical fiber having a first end for receiving the optical signals and an opposed second end;
   at least one micromanipulator for controllably positioning the second end of a respective optical fiber relative to the second ends of the other optical fibers, thereby shifting the phase of the optical signals emitted by the respective optical fiber such that the optical signals emitted by each of said optical fibers have a predetermined phase relationship;
   a controller for directing each said micromanipulator to controllably position the second end of the respective optical fiber;
   a source of reference signals;
   an optical splitter for sampling and separately directing the optical signals emitted by each optical fiber with respective reference signals; and
   a plurality of detectors for detecting the separate signals with each detector associated with a respective optical fiber,
   wherein said controller is responsive to said detectors to position the second end of each optical fiber so as to maximize the power of the combined signals.

7. An apparatus to claim 6 wherein said controller simultaneously positions the second end of each optical fiber.

8. An apparatus for phase shifting at least one of a plurality of optical signals, the apparatus comprising:
   a plurality of optical fibers through which optical signals propagate from a first end to an opposed second end;
   at least one micromanipulator for controllably positioning the second end of a respective optical fiber relative to the second ends of the other optical fibers, each micromanipulator comprising a carrier upon which the second end of the respective optical fiber is mounted and at least one actuator element for moving the carrier and the second end of the respective optical fiber; and
   a controller for directing each said actuator element to move the carrier and the second end of the respective optical fiber, thereby shifting the phase of the optical signals emitted by the respective optical fiber such that the optical signals emitted by each of said optical fibers have the same phase.

9. An apparatus according to claim 8 further comprising a plurality of micromanipulators operating under direction of said controller, wherein each micromanipulator is associated with a respective optical fiber for controllably positioning the second end thereof.

10. An apparatus according to claim 8 wherein the optical signals have a predetermined direction of propagation following emission by said optical fibers, and wherein each said micromanipulator moves the second end of the respective optical fiber nominally along the predetermined direction of propagation in order to shift the phase of the optical signals.

11. An apparatus according to claim 8 further comprising a common optical source for providing optical signals to said plurality of optical fibers.

12. An apparatus for phase shifting at least one of a plurality of optical signals, the apparatus comprising:
    a plurality of optical fibers through which optical signals propagate from a first end to an opposed second end;
    at least one micromanipulator for controllably positioning the second end of a respective optical fiber relative to the second ends of the other optical fibers, each micromanipulator comprising a carrier upon which the second end of the respective optical fiber is mounted and at least one actuator element for moving the carrier and the second end of the respective optical fiber;
    a controller for directing each said actuator element to move the carrier and the second end of the respective optical fiber, thereby shifting the phase of the optical signals emitted by the respective optical fiber such that the optical signals emitted by each of said optical fibers have a predetermined phase relationship;
    a source of reference signals;
    an optical splitter for sampling and separately directing the optical signals emitted by each optical fiber along with respective reference signals; and
    a plurality of detectors for measuring the separate signals with each detector associated with a respective optical fiber,
    wherein said controller is responsive to said detectors to position the second end of each optical fiber so as to maximize the power of the combined signals.

13. An apparatus according to claim 12 wherein said controller simultaneously positions the second end of each optical fiber.

14. A method for phase shifting at least one of a plurality of optical signals, the method comprising:
    providing optical signals having a predetermined wavelength;
    transmitting the optical signals along a plurality of optical fibers from a first end of each optical fiber to an opposed second end; and
    controllably positioning the second end of a respective optical fiber relative to the second ends of the other optical fibers in order to shift the phase of the optical signals emitted by the respective optical fiber such that the optical signals emitted by each of said optical fibers have the same phase.

15. A method according to claim 14 further comprising controllably positioning the second end of each optical fiber.

16. A method according to claim 14 wherein the optical signals have a predetermined direction of propagation following emission by the optical fibers, and controllably positioning the second end of the respective optical fiber comprises moving the second end of the respective optical fiber along the predetermined direction of propagation in order to shift the phase of the optical signals.

17. A method for phase shifting at least one of a plurality of optical signals, the method comprising:
    providing optical signals having a predetermined wavelength;
    transmitting the optical signals along a plurality of optical fibers from a first end of each optical fiber to an opposed second end for emission therefrom;

separately combining the optical signals emitted by each optical fiber with respective reference signals;

detecting the combined signals; and controllably positioning the second end of a respective optical fiber relative to the second ends of the other optical fibers in order to shift the phase of the optical signals emitted by the respective optical fiber such that the optical signals emitted by each of said optical fibers have a predetermined phase relationship that serves to maximize the power of the combined signals.

18. A method according to claim 17 wherein controllably positioning the second end of each optical fiber comprises simultaneously positioning the second end of each optical fiber.

* * * * *